(12) United States Patent
Chaudhuri et al.

(10) Patent No.: US 7,139,778 B2
(45) Date of Patent: Nov. 21, 2006

(54) LINEAR PROGRAMMING APPROACH TO ASSIGNING BENEFIT TO DATABASE PHYSICAL DESIGN STRUCTURES

(75) Inventors: Surajit Chaudhuri, Redmond, WA (US); Vivek Narasayya, Redmond, WA (US); Mayur Datar, Stanford, CA (US)

(73) Assignee: Microsoft Corporation, Redmond, WA (US)

( * ) Notice: Subject to any disclaimer, the term of this patent is extended or adjusted under 35 U.S.C. 154(b) by 423 days.

(21) Appl. No.: 10/186,821

(22) Filed: Jun. 28, 2002

(65) Prior Publication Data

US 2004/0002957 A1 Jan. 1, 2004

(51) Int. Cl.
*G06F 17/30* (2006.01)

(52) U.S. Cl. .............................. 707/200; 707/2; 707/1; 707/100

(58) Field of Classification Search ................ 707/100, 707/1, 2, 200
See application file for complete search history.

(56) References Cited

U.S. PATENT DOCUMENTS

| 5,960,423 | A | * | 9/1999 | Chaudhuri et al. ............. 707/2 |
| 6,622,221 | B1 | * | 9/2003 | Zahavi ........................ 711/154 |
| 2003/0093408 | A1 | * | 5/2003 | Brown et al. ................. 707/2 |

OTHER PUBLICATIONS

"A Framework for Automating Physical Database Design", Steve Rozen and Dennis Shasha, Proceedings of the 17th International Conference on Very Large Databases, pp. 401-411, Barcelona, Sep. 1991.
"Implementing Data Cubes Efficiently", Venky Harinarayan, Anand Rajaraman and Jeffrey D. Ullman, SIGMOD, 1996, Montreal, Canada, pp. 205-216.
"Index Selection in a Self-Adaptive Data Base Management System", Michael Hammer and Arvola Chen, Laboratory for Computer Science, MIT, Cambridge, Massachusetts, pp. 1-8, SIGMOD, 1976.
"Index Selection for OLAP", Himanshu Gupta, Venky Harinarayan, Anand Rajaraman and Jeffrey Ullman, Dept. of Computer Science, Stanford University, California, pp. 208-216, 1997, IEEE.
"Physical Database Design for Relational Databases", S. Finkelstein, M. Schkolnick and P. Tiberio, IBM Almaden Research Center, Mar. 1988, ACM Transactions on Database Systems, vol. 13, No. 1, pp. 91-128.

(Continued)

*Primary Examiner*—Don Wong
*Assistant Examiner*—Sheree Brown
(74) *Attorney, Agent, or Firm*—Microsoft Corporation

(57) ABSTRACT

In a relational database system, a set of physical design structures is enumerated that optimizes database performance over a given workload consisting of workload entries that include queries and updates that have been executed against the database. An individual benefit is calculated for each candidate structure relevant to a given workload entry and these individual benefits are summed over the entries in the workload examined thus far. A workload entry is selected from the workload and a set of candidate structures relevant to the workload entry is identified. A benefit is assigned to each of the candidate structures by 1) evaluating the workload entry in the presence of subsets of candidate structures to obtain an actual benefit for each subset of candidate structures; 2) forming a set of constraints on the structure benefits of candidate structures based on the actual benefits determined for each subset of candidate structures; and 3) determining the individual benefit of each candidate structure by resolving the constraints. The set of physical design structures is enumerated based on the determined benefit for each candidate structure.

35 Claims, 4 Drawing Sheets

OTHER PUBLICATIONS

"AutoAdmin "What-If" Index Analysis Utility", Surajit Chaudhuri and Vivek Narasayya, In Proceedings of ACM SIGMOD, Seattle, WA, 1998, 12 pages.

"An Efficient, Cost-Driven Index Selection Tool for Microsoft SQL Server", Surajit Chaudhuri and Vivek Narasayya, pp. 146-155, Proceedings of the 23rd VLDB Conference, Athens, Greece, 1997.

"Index Selection in Relational Dtabases", Sunil Choenni, Henk Blanken, Thiel Chang, In Proceedings of the 5th IEEE ICCI, 1993, pp. 491-496.

"DB2 Advisor: An Optimizer Smart Enough to Recommend its Own Indexes", Gary Velentin, Michael Zuliani, Daniel C. Zilio, Guy Lohman and Alan Skelley, In Proceedings of the Sixteenth International Conference on Data Engineering, San Diego, CA, 2000, pp. 101-110.

"Automated Selection of Materialized Views and Indexes for SQL Databases", Sanjay Agrawal, Surajit Chaudhuri and Vivek Narasayya, In Proceedings of the 26th International Conference on Very Large Databases, Cario, Egypt, 2000, pp. 496-505.

"Materialized View Selection for Multi-Cube Data Models", Amit Shukla, Prasad M. Deshpande and Jeffrey F. Naughton, In Proceedings of EDBT 2000, Heidelberg, pp. 269-284.

Kiyosi Ito, "Encyclopedic Dictionary of Mathematics", 1996, pp. 1319-1320, vol. 2, The MIT Press, Cambridge, Massachusetts, and London, England.

"Math Dictionary", (http://users.adelphia.net/~mathhomeworkhelp/Rdictionary.html).

Dilara Dorak and M. Tevfik Dorak, "Common Terms In Mathematics", (http://dorakmt,tripod.com/mtd/glosmath.html).

"PRIME Mathematics Encyclopedia", (http://mathacademy.com/pr/prime).

"On-line glossary of technical notation", (http://mathpropress.com/notation/notation.html).

* cited by examiner

LINEAR PROGRAMMING APPROACH TO ASSIGNING BENEFIT TO DATABASE PHYSICAL DESIGN STRUCTURES

TECHNICAL FIELD

The present invention relates generally to the field of database systems. More particularly, the present invention relates to the field of query optimization for database systems.

BACKGROUND OF THE INVENTION

Computer database systems manage the storage and retrieval of data in a database. A database comprises a set of tables of data along with information about relations between the tables. Tables represent relations over the data. Each table comprises a set of records of data stored in one or more data fields. The records of a table are also referred to as rows, and the data fields of records in a table are also referred to as columns.

A database server processes data manipulation statements or queries, for example, to retrieve, insert, delete, and update data in a database. Queries are defined by a query language supported by the database system. Due to the importance of the physical design several commercial database systems include tools for automating the choice of physical design structures such as indexes and materialized views to be included as part of the physical design of the database. These tools include the Tuning Wizard in Microsoft SQL Server 7.0 and 2000. One important aspect of these tools is that they take as input a workload consisting of SQL queries and updates and tune the physical design such that the performance of the workload is optimized. Such workloads can be obtained by using event logging capabilities in the database system, e.g. SQL Server Profiler in Microsoft SQL Server 2000. Often, the workloads provided as input to the tool can be large since the workload contains queries that execute over a relatively large window of time (e.g., a day or week). Faced with a large workload (i.e., large number of queries and updates), the running time of these tools can be become significant. In Tuning Wizard for Microsoft SQL Server 2000, there are three modes in which tuning can be performed: Fast, Medium, and Thorough. Each of these modes performs progressively more detailed analysis requiring more time, but produces better quality recommendations. However, physical design tuning is often done during a batch window, e.g., overnight, when the database server is not loaded or is offline. Note that none of the tuning modes can guarantee that tuning is completed within a specified period of time, and if the tuning process must be terminated prior to its completion, a significant amount of the work done by the tuning thus far may be lost.

In the realm of automatic database tuning, the task of index selection, i.e. automatically selecting an appropriate set of indexes for a given database and workload is challenging for several reasons. First, because database schema of real applications can be large and indexes can be defined on a sequence of one or more columns, the space of indexes that are relevant for the workload (i.e., can possibly be used to answer queries in the workload) can be very large. Second, today's query optimizers can exploit available indexes in sophisticated ways such as intersection of two or more indexes, use of covering indexes, etc . . . . Thus it becomes important to take into account interactions among indexes. For example, the presence of a clustered index on each of the join attributes can result in a very efficient plan for the join (using the clustered index on each of the join attributes can result in a very efficient plan for the join (using the Merge Join operator)), whereas the presence of only one index but not the other may result in a plan with significantly higher cost. Third, the choice of indexes must be done while honoring certain constraints, e.g. limiting the amount of storage space allotted to indexes, and ensuring that at most one clustered index per table can be chosen. Thus index selection can be viewed as an optimization problem where the goal is to find the most beneficial subset of the relevant indexes for the workload that obeys the given constraints.

Recently, several major database vendors have begun shipping index selection tools to address the issue of interactions among indexes. Microsoft's SQL Server product uses a hill climbing algorithm, referred to as Greedy(m,k), as the search strategy. Greedy(m,k) starts by enumerating all sets of size m from the candidate set. It chooses the optimal set of size m and then greedily (based on the additional benefit accrued given the current configuration) adds the indexes until the size of the set reaches k. The value of k is determined by storage constraints. One drawback to the Greedy(m,k) approach is that it cannot provide a guarantee about the quality of the solution produced. This approach also lacks formal analysis and can end up doing significant work since it enumerates overall sets of size m. Moreover, even in the greedy phase, it evaluates every candidate index against the entire workload to find its incremental benefit.

For automatic index selection, IBM's DB2 product implements a Knapsack based algorithm underlying the index selection tool. This approach converts the Index Selection problem to a 0-1 Knapsack problem and then uses the greedy algorithm. The crucial step in the Knapsack approach is the assignment of benefits to indexes. In the DB2 approach, the benefit on an index belong to the best set of indexes for a query, is defined as the entire benefit of the winning set of indexes for that query. Also, the initial solution obtained from the greedy Knapsack is refined by calling a routine called "TRY_VARIATION" that creates a variant of the solution by randomly swapping a small set of indexes in the solution for a small set of indexes not in the solution. Like Greedy(m,k) IBM's Knapsack is unable to provide any guarantees about the quality of the solution produced. In addition, indexes that do not make a big difference to a query may be assigned a high benefit just because they are part of the winning configuration for that query meaning that this approach may overestimate the benefits of unimportant indexes.

SUMMARY OF THE INVENTION

By calculating and assigning an individual benefit to each candidate physical design structure, the enumeration of an optimal set of physical design structures is simplified. Constructing a set of constraints on the individual benefit of a candidate structure based on actual benefits obtained using sets of candidate structures improves the accuracy of the individual benefit. This is because by taking into account observed interactions between candidate structures, it is not necessary to assume independence between the candidate structures.

In a relational database system, a set of physical design structures is enumerated that optimizes database performance over a given workload consisting of workload entries that include queries and updates that have been executed against the database. A workload entry is selected from the workload and a set of candidate structures relevant to the workload entry is identified. A benefit is assigned to each of the candidate structures by 1) evaluating the workload entry in the presence of subsets of candidate structures to obtain an actual benefit for each subset of candidate structures; 2) forming a set of constraints on the structure benefits of candidate structures based on the actual benefits determined for each subset of candidate structures; and 3) determining the benefit of each candidate structure by resolving the constraints. The set of physical design structures is enumerated based on the determined benefit for each candidate structure.

The candidate structures may comprise indexes on one or more attributes of the database or materialized views of portions of the database. Additional entries may be selected from the workload and benefits calculated for each of the additional entries. A cumulative benefit is then tabulated for each candidate structure by combining the benefit determined for the candidate structure for each entry that is evaluated. The enumerating step is performed by ranking the candidate structures based on their benefit, such as a benefit to storage ration, and adding the candidate structures having the highest rank to the enumerated set until a predetermined storage limit is filled by the enumerated structures.

A set of constraints on the benefit of a structure may be constructed by forming a set of simultaneous linear inequations that reflect the actual benefit determined for each candidate structure in the subset of candidate structures. The linear inequations are constructed by setting a minimum value and a maximum value for a combined benefit of the candidate structure based on the actual benefit obtained for that subset of candidate structures. The minimum value is the actual benefit for the subset of candidate structures divided by first constant and the maximum value is the actual benefit for the subset of candidate structures multiplied by second constant. The first and second constants may be equal. A solution to the inequations that minimizes the value of the larger of the first and second constants is selected.

The set of candidate structures for an entry being evaluated may be pruned based on a pruning criteria such as a limit on the number of structures in the subset of candidate structures.

Further advantages and a fuller understanding of the invention will be had from the accompanying drawings and the detailed description of the invention.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF PREFERRED EMBODIMENT

Exemplary Operating Environment

Figure 1:
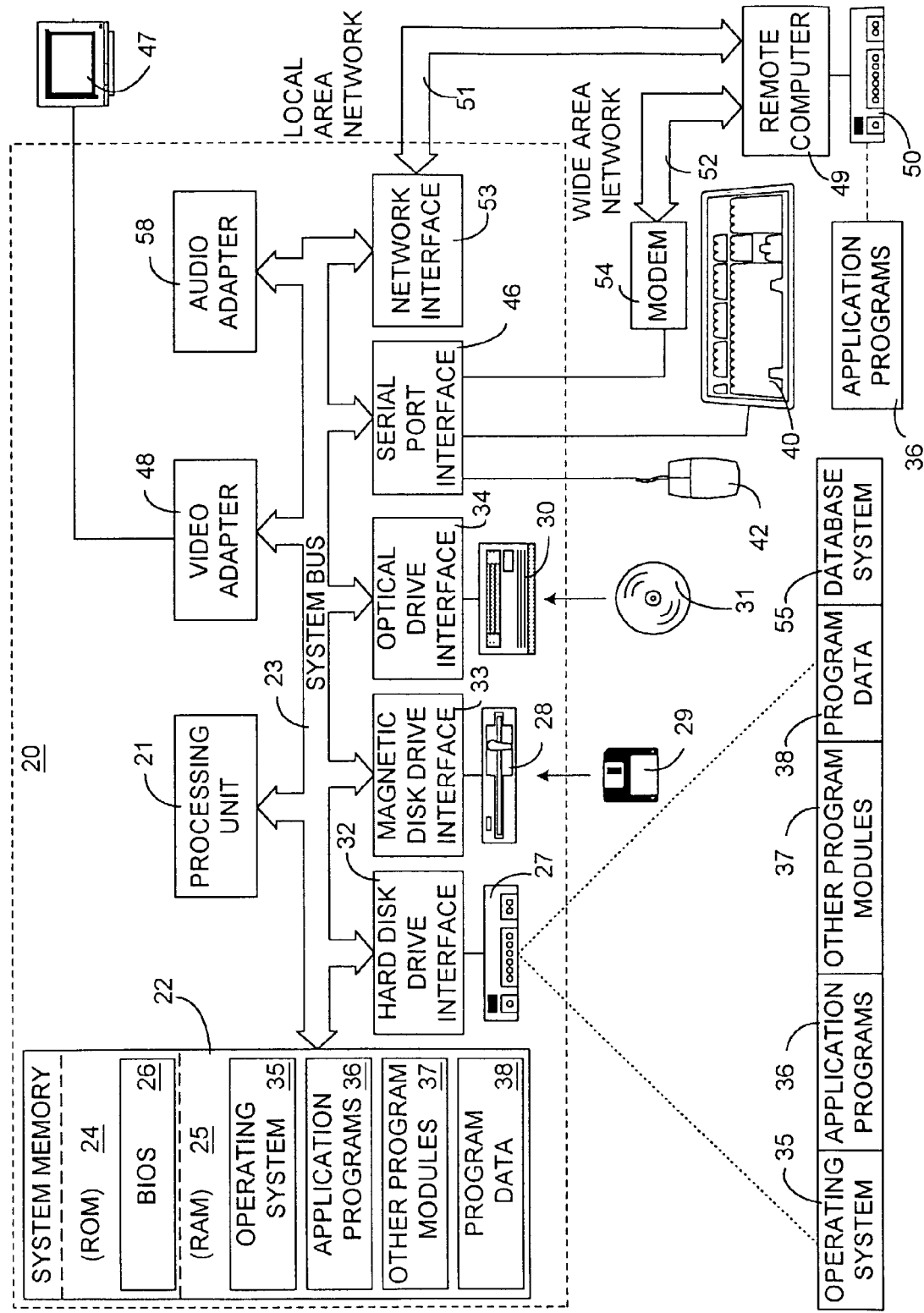
FIG. 1 illustrates an exemplary operating environment for tuning a database within a given time bound.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 24 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disk drive 30 for reading from or writing to a removable optical disk 31 such as a CD ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk, magnetic disk 129, optical disk 31, ROM 24 or RAM 25, including an operating system 35, one or more application programs 36, other program modules 37, and program data 38. A database system 55 may also be stored on the hard disk, magnetic disk 29, optical disk 31, ROM 24 or RAM 25.

A user may enter commands and information into personal computer 20 through input devices such as a keyboard 40 and pointing device 42. Other input devices may include a microphone, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include local area network (LAN) 51 and a wide area network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other means for establishing communication over wide area network 52, such as the Internet. Modem 54, which may be internal or external, is connected to system bus 23 via serial port interface 46. In a networked environment, program modules depicted relative to personal computer 20, or portions thereof, may be stored in remote memory storage device 50. It will be appreciated that the network connections shown are exemplary and other means of establishing a communications link between the computers may be used.

Time-Bound Tuning of Physical Database Design

Figure 2:
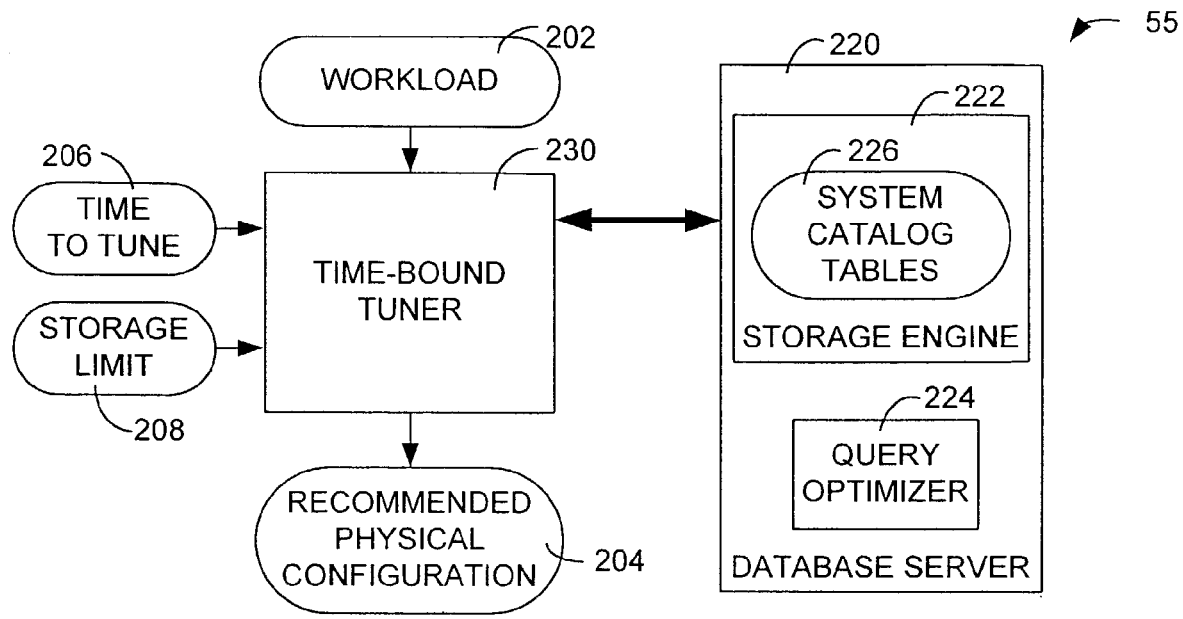
FIG. 2 is a block diagram of a database system that includes a time-bound tuner.

FIG. 2 illustrates one example of a computer database system that includes a time-bound tuner 230 for recommending a database physical configuration for query optimization. The database system 55 comprises a database (not shown), a database server 220, and a time-bound tuner 230. Database system 200 manages the storage and retrieval of data in database in accordance with data manipulation statements or queries presented to database system 200 by a database application or by a user, for example.

The database comprises a set of tables of data along with information about relations between the tables. Tables represent relations over the data. Each table comprises a set of records of data stored in one or more data fields. The records of a table are also referred to as rows, and the data fields of records in a table are also referred to as columns.

Database server 220 processes queries, for example, to retrieve, insert, delete, and/or update data in database. Database system 200 may support any suitable query language, such as Structured Query Language (SQL) for example, to define the queries that may be processed by database server 220. Suitable SQL queries include, for example, Select, Insert, Delete, and Update statements. Database server 220 for one embodiment comprises the Microsoft® SQL Server.

Database server 220 comprises a storage engine 222 for accessing data in the database. To enhance performance in processing queries, database server 220 uses indexes and materialized views and/or other structures that may reside in system catalog tables 226 to help access data in the database more efficiently. This combination of indexes, materialized views, and other physical design structures is referred to as the physical configuration of the database system. Database server 220 comprises a query optimizer 224 to generate efficient execution plans for queries with respect to a set of indexes. In generating execution plans, query optimizer 224 relies on indexes or materialized views on column(s) of table(s) or tables(s) referenced in a query to estimate, for example, the cost in time to execute the query against the database using more than one possible execution plan for the query. Query optimizer 224 may then choose among possible execution plans for the query. As the database system is acted upon by users issuing queries and updates, it becomes necessary to update the physical configuration of the database. To perform time-bound tuning, a user inputs to the time-bound tuner both an upper limit 206 or bound on the time that may be expended during the tuning process and the amount of storage 208 that may be used to store a physical configuration. The time-bound tuner outputs a recommended physical configuration 202 at the end of the time limit. The use of a time-bound on tuning insures that the tuning process will be complete prior to restarting normal operation of the database.

Workload 202 may be any suitable set of one or more queries. Workload 202 may be, for example, a representative set of one or more queries to be executed against the database. Workload 202 may be an organization specific representative workload used by a database administrator or a set of one or more queries identified by logging events at database server 220. Where database server 220 comprises the Microsoft® SQL Server, for example, the database administrator can use the SQL Server Profiler to log all queries that executed on database server 220 over the past week, for example. In addition, filters can be applied on a number of properties of the events in the log to select queries in accordance with a predetermined criteria. Queries that take at least one second to execute, for example, may be logged.

The time-bound tuner 230 attempts to produce the best possible recommended physical configuration given the workload and the time and storage limits. As will be discussed in greater detail below, the tuner proceeds incrementally to improve the existing configuration by examining a next portion of the workload, and arrives at a recommended configuration for that part of the workload that has been examined. If a relatively small time limit is passed to the tuner, each incremental tuning consumes a small amount of time, meaning only the most expensive queries and structures beneficial to those queries are included, while a relatively large time limit enables more detailed analysis for each increment of tuning.

Database server 220, storage engine 222, query optimizer 224, and time-bound tuner 230 are implemented for one example as program modules or computer-executable instructions and may be stored on any suitable computer-readable medium for execution in a suitable operating environment, such as the computing environment of FIG. 1 for example. The data of database 210 and system catalog tables 226 may be implemented in the form of one or more suitable data structures and may also be stored on any suitable computer-readable medium.

Figure 3:
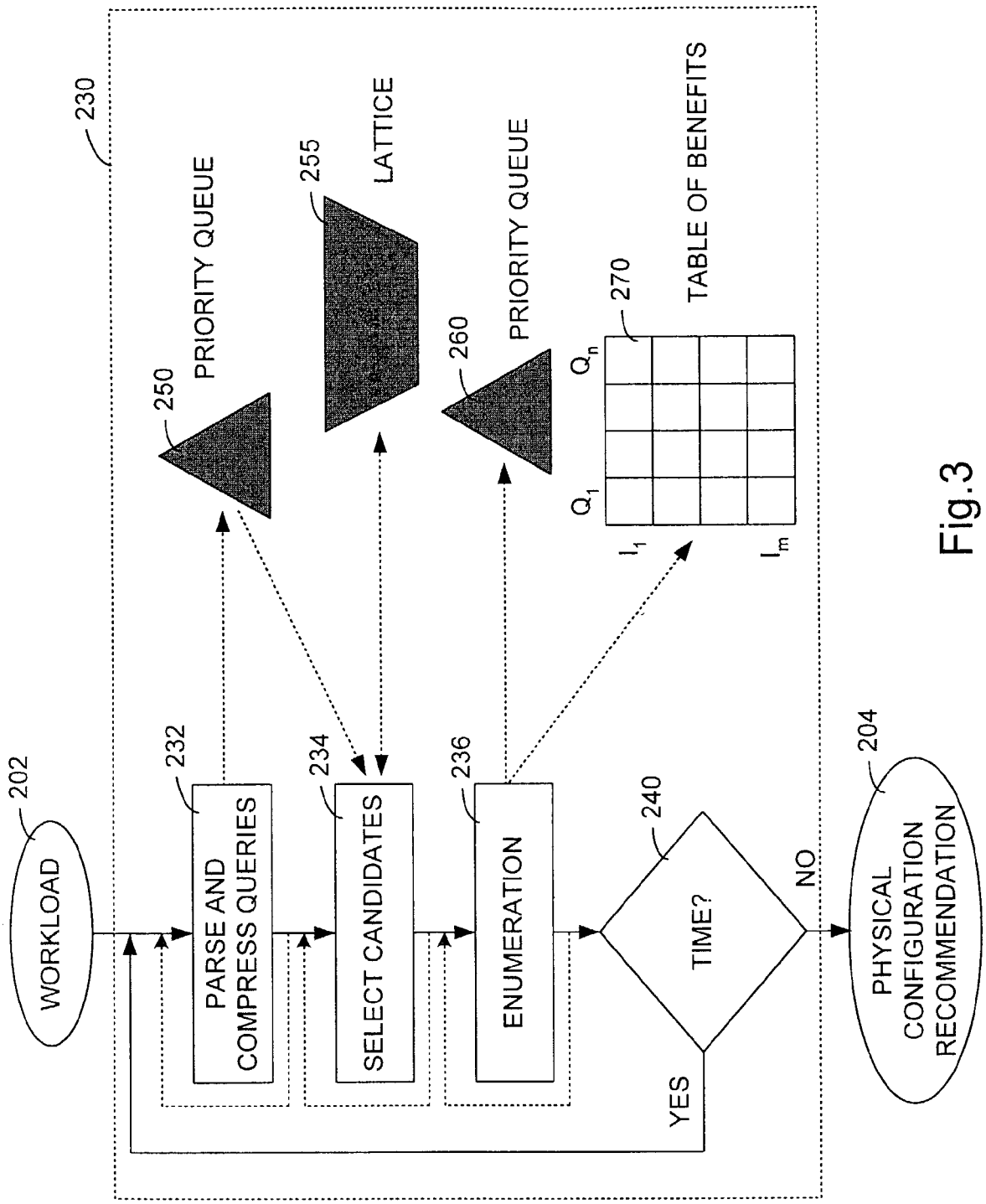
FIG. 3 is a more detailed diagram of the time-bound tuner of FIG. 2.

FIG. 3 illustrates in more detail the time-bound tuner 230 that produces a recommended physical configuration for the database given the workload and time/storage constraints.

The workload 202 is the basis for the tuner's operation and a timer 240 contains an upper limit on the time allotted for tuning. The time-bound tuner 230 includes three modules, a module for parsing and compressing the queries in the given workload 232, a module for selecting candidates for each query that are useful in answering the query 234, and an enumeration module 236 that finds a subset of the candidates chosen by the select candidates module 234 that satisfy the storage constraint and gives the maximum improvement for the workload. Each of these modules is tailored to effectuate time-bound tuning.

A key issue in time-bound tuning is that the above three modules cannot be invoked in sequence on the entire workload. This is because (a) the time taken to simply parse all queries in the workload may exceed the total time-bound and (b) because one of the design goals is to ensure that the recommendation improves at a relatively small time granularity. To implement time-bound tuning, the time-bound tuner partitions the total time-bound into small time slices, or portions, and invokes the above three modules in three phases within each time slice. In each time slice an additional set of queries is parsed from the workload, candidates are found for some more queries, and a revised (and hopefully improved) configuration recommendation for the workload that has been seen thus far is found. For the purposes of this description, the queries in the workload are parsed in chronological order and the time allotted to the three phases is relatively uniform throughout the workload. However, based on additional information about the workload that may be available such as a query cost distribution, less "interesting" (less expensive) sequences of queries may be analyzed using a larger portion of the time slice devoted to parsing to reach the "interesting" portion of the workload at which point the parsing may be allotted a smaller amount of time to provide a more detailed analysis. In addition, the workload may be parsed in an order other than chronological order.

The granularity at which the recommendations improve is the granularity of a time slice. The time slice duration is determined by the total time-bound, since when a large time-bound is provided, users are typically satisfied if the improvements occur at a slightly slower granularity. Thus, for the described embodiment, the duration of a time slice is set to the square root of the total time-bound, which is a slowly growing function of the total time-bound. This duration has been found to be reasonable through experimentation. For this embodiment, a minimum and maximum limit is imposed on the duration of a time slice. The minimum limit is dictated by the fact that very small time slices incur a high overhead of repeated invocation of various steps without actually getting useful work in the steps done. A minimum time slice of one minute has been found to be effective. The maximum time slice is determined by the criteria that recommendation should improve at a fine granularity. Thus for this embodiment, the maximum time slice is fifteen minutes.

For the described embodiment, the time in a time slice is allocated as follows: twenty percent of the time is spent parsing and the remaining eighty percent of the time is divided equally between candidate selection and enumeration. This allocation was selected because parsing a query requires one call to the query optimizer and is generally much faster than the work done for the query in candidate selection, which typically requires several optimizer calls, or work done for the query in enumeration. With this allocation, it has been observed that several queries can be examined before starting candidate selection, thereby increasing the likelihood that important queries are analyzed. If the work to be done within a time slice terminates earlier than the time allotted, the next time slice is begun.

Since the goal of time-bound tuning is to find a configuration (i.e. a set of physical design structures such as indexes, materialized views, etc . . . ) with the maximum improvement for the given workload, one of the challenges is that the tuning time be spent on queries and physical structures which, if considered, are likely to result in significant improvement for the workload. A second challenge is that since the tuning is done incrementally in time slices, efficient data structures and algorithms that work well incrementally are necessary.

Referring again to FIG. 3, a more detailed description of the operation of the various modules and data structures within the timebound tuner 230 will be described. After queries are parsed and compressed by module 232, the compressed queries are placed into a priority queue shown schematically as 250, where the priority of a query is its estimated execution cost (as estimated by the query optimizer). A more detailed description of the compression process can be found in U.S. patent application Ser. No. 10/180,667, which is incorporated by reference herein in its entirety. The priority queue can be maintained very efficiently even when the number of queries added to it are large (logarithmic in the number of queries). The operation of finding and extracting the next most expensive query to tune is also very efficient.

Figure 4:
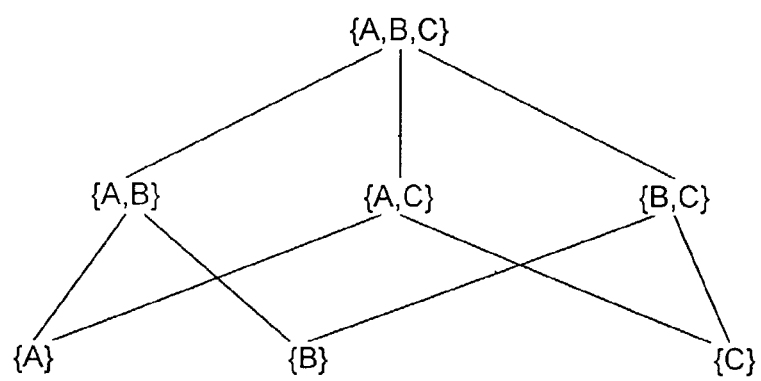
FIG. 4 is a data structure summary of frequently referenced tables/columns that is maintained in accordance with an embodiment of the present invention.

A lattice of frequently referenced sets of tables (as well as a frequently referred sets of columns for each table) is maintained in the workload as illustrated schematically as 255 (an example lattice is shown in FIG. 4). A set of tables (referred to as a table subset) is considered frequent if it is referenced in queries whose total cost exceeds a predetermined percentage of the cost of queries in the workload seen thus far. This technique allows the tuner to focus on important sets of objects (tables/columns) for the workload quickly without having to make several optimizer calls.

Known techniques for efficiently computing the lattice for a given workload can be adapted to construct the lattice in a bottom-up manner as shown in FIG. 4. However, in time-bound tuning, each time slice parses an additional set of queries that can affect the table subsets that need to be maintained in the workload. If the lattice were to be recomputed from scratch for each time slice by taking the entire workload into account (including the queries seen in the current time slice), the approach would not be scalable. Instead, a lattice is computed only for the workload in the current time slice and then the newly computed lattice is merged with the lattice that has been produced from all previous time slices combined. The merge technique is based on the following observation: if an element occurs in both lattices, its frequency exceeds the threshold in both cases and therefore it must be part of the new lattice. By a similar argument, if the element does not occur in either element it cannot be a part of the new lattice. When an element occurs in one lattice but not in the other, the frequency of that element is computed for the portion of the workload for which it was not frequent. If the combined frequency now exceed the threshold, the element becomes part of the new lattice. The updated frequencies for all such undecided elements can be computed in a single pass of the workload seen thus far.

The enumeration module 236 utilizes an LP Solver/Knapsack based algorithm that is described in more detail below. In general, the enumeration algorithm assigns a benefit to each structure (e.g. index) that is relevant to a query based on the given query and set of configurations that are relevant for that query, shown schematically as 270. This assignment is performed such that when the benefits for a given subset of the indexes are summed up, they most closely approximate the actual benefit if that subset of indexes were present. During enumeration, a set of cells is evaluated as determined by a priority queue of cells shown generally as 260. For exactly the set of queries that were evaluated above, the LP solver is incrementally invoked to readjust the benefits for structures referenced in those cells. After that, the Knapsack search algorithm (that requires no further optimizer calls) is re-run to quickly produce a new configuration whose quality is evaluated. These steps are repeated at a fine granularity within the enumeration step.

A significant portion of the time taken during enumeration is spent in making calls to the optimizer. Each call returns the estimated cost of a (Query, Configuration) pair. Thus, to use the given time-bound effectively, the optimizer calls that could result in potentially the most improvement for the workload should be made first. The achieve this, a function that estimates the importance of a cell is used to order the cells in a priority queue based on the value produced by this estimator. This function takes into account the following factors: (a) cost of the query (b) potential applicability of the structures in the configuration to the workload. The following function is used for estimating "importance" of cell (Q,C) where Q is a query and C is a configuration: Applicability(C) is the total cost of all queries for which configuration C in its entirety is applicable (i.e. all objects in C can be used by the query optimizer to answer the query). The cost of queries can be calculated in one of two ways. The cost of the queries can be calculated based on the physical configuration of the database prior to the initiation of the time-bound tuning or the cost can be calculated based on the most recent configuration that has been constructed during the present tuning. In case two cells have the same importance, the tie is broken by assigning a higher rank to whichever cell contains the query with higher current cost. This focuses the tuner on expensive queries while at the same time paying more attention to structures that together are widely applicable in the workload. Note that for any configuration C, Applicability(C)≧Applicability(C∪{I}) where I is any structure such as an index or indexed view. Thus, for a given query, the above function favors evaluating smaller (and hence more widely applicable) configuration earlier. It has been observed that this function is more effective for a variety of database workloads than either Cost(Q) or Cost(Q)*Applicability(C).

When a recommendation is proposed, it is typical to provide a set of quantitative analysis reports that describe the impact of accepting the recommendation (e.g. expected improvement for the workload compared to the current physical design, which indexes are used and how many times, etc.). To obtain these reports, at the end of the tuning, a pass is performed over the tuned workload in which the optimizer is invoked two times for each query: once for the current physical design and once of the recommended design. For large workloads, making this pass can be time consuming and must be incorporated into the time-bound tuning process. Therefore, a running estimate is kept of how much time is required to make two optimizer calls for the workload tuned thus far. This running estimate is based on the observed time for invoking the optimizer for each query. When this estimate is equal to the total remaining time, the actual tuning is terminated and the final pass is started to ensure that the given time limit is not exceeded by a significant amount.

Assigning Benefits to Data Structures Using LP Solver/Knapsack Algorithm

To implement time-bound tuning as described above, an enumeration algorithm called LP Solver/Knapsack is used to assign benefit to indexes that performs well in the time-bound tuning environment. While LP Solver/Knapsack is described herein in the context of selecting indexes in a time-bound tuning, it is contemplated that the algorithm can be used in any database configuration tuning system where it is helpful to assign benefit to any type of individual candidate physical design structure based on interactions between structures.

For the purposes of this description it is assumed that for any given database table, or relation, there can be at most one clustered index. The indexes considered are built over the relations and are denoted by $i_1, \ldots, i_k, \ldots$ where k denotes the k-th index from a list of indexes defined over the relation. A set of indexes is termed as a configuration. The workload, denoted by Q, is a set of SQL statements $q_1, \ldots, q_m$, that may include select, insert, delete or update statements. Besides specifying the workload, the user may also specify a base configuration, i.e., a set of indexes (possibly empty) that must be part of the configuration that is output. Such a base configuration may include, e.g., the indexes used to enforce referential integrity such as primary key constrains. The benefit of a configuration with respect to a query (or a workload) is defined as the decrease in the estimated cost of the query (or the workload) with respect to the base configuration and includes the cost of maintaining the configuration. Note that the benefit could be negative for certain combinations of queries and configurations, typically update queries. A formal definition of the notion of benefit as defined for the purposes of this description is:

Given a set of indexes $I=i_1, i_2, \ldots, i_n$ with non negative storage $s_1, \ldots, s_n$, and a set of queries (workload) $Q=q_1, q_2, \ldots, q_m$. The benefit for a query $q_j$ is a function $F_{q_1}: 2^I \mapsto \mathcal{R}$ The set I is partitioned into disjoint sets $B_j$, $$I = \bigcup_{j=1}^{h} B_j.$$

A valid solution $S \subseteq I$ is a set of indexes that satisfies the following two conditions: at most one index is chosen from every set $B_j$ and $$\sum_{t_k \in S} s_k \leq T$$

where T is a threshold specified by the user. The aim is to choose a valid solution S that maximizes $$\sum_{q_i \in Q} F_{q_i}(S).$$

Automatic index selection algorithms seek to recommend a set of indexes that have the maximum benefit for a given workload and database. The storage space required to build the indexes should not exceed a certain user specified bound. Moreover, the recommended configuration should be valid, i.e. it should contain the base configuration and must have at most one clustered index. Because the indexes are selected based on their benefit with respect to the workload, the benefit assignment performed by the LP Solver/Knapsack is critical to obtaining good results.

The LP Solver/Knapsack algorithm is performed in a preprocessing phase that assigns benefits to indexes in a principled manner such that when the atomic benefits associated with indexes in a given configuration are added together, they approximately equal the benefit found for the configuration. This approach makes the application of a Knapsack type index selection algorithm more accurate and scalable.

Figure 5:
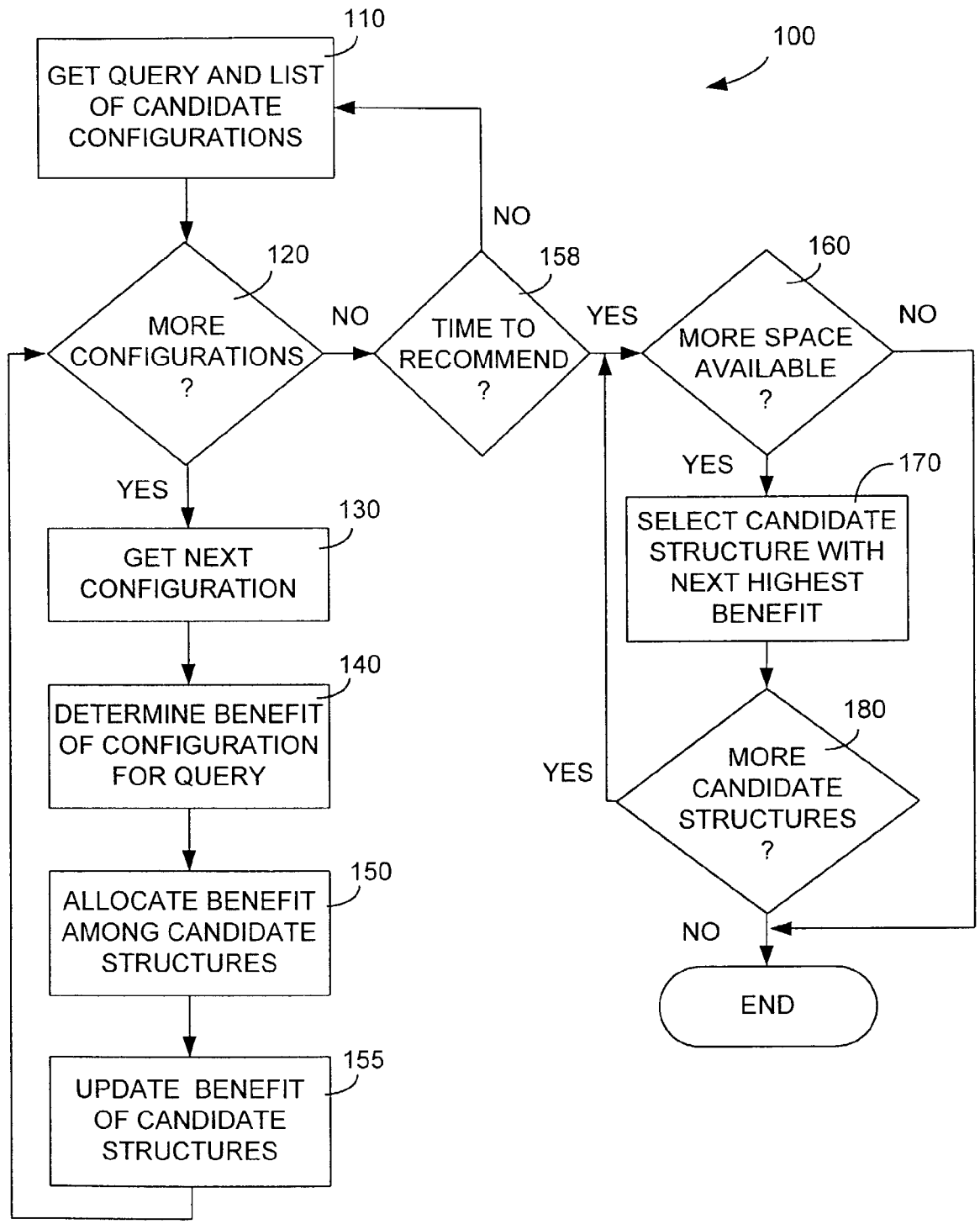
FIG. 5 is a flow chart diagram of a method for selecting an index configuration according to an embodiment of the present invention.

FIG. 5 illustrates a method 100 for assigning benefits to structures that takes into account interactions between the structures. With respect to a query in the workload, the method assigns an individual, or atomic, benefit to a given structure based on the benefits realized by any configuration that includes the given structure. To make the atomic assignment, the method solves a set of linear equations based on the benefit realized by each configuration that includes the given structure.

In step 110, a list of candidate configurations and query pairs relevant to the query being examined is presented to the algorithm. A configuration and query pair is chosen for analysis in step 130, and in step 140 the query optimizer is called to determine the benefit of the configuration for execution of the query. As discussed in conjunction with the time bound tuning technique described in an earlier section, the configurations may first be ranked based on an applicability measure and the query optimizer is then called on to determine the benefit of configurations in the order they are ranked. An actual benefit is calculated for the configuration based on the optimizer call and in step 150, the overall benefit is allocated amongst the structures that make up the configuration without assuming independence. The benefit for a group of structures is treated as the sum of benefits for the individual structures, a property that will be referred to hereinafter as "linearity". Thus, for a given query $q_j$, benefits are assigned to relevant structures of $q_j$ so that these benefits follow the same property of linearity.

Given a query q for the workload, with benefit function $F_q$. Let $I_q = \{i_1, \ldots, i_m\}$ be the set of relevant structures (for ease of notation in this portion of the description it is assumed that indexes are the only relevant structures being considered) for the query as found in step 110. Note that for any index that is not relevant for the query, a benefit of zero is assigned. If $F_q: 2^{I_q} \mapsto \mathcal{R}$ is restricted to $I_q$, it is desirable to assign benefits $B = \{b_1, \ldots, b_m\}$ to indexes in $I_q$ such that they follow linearity, i.e. $\forall S \subseteq I_q : \phi(S).B = F_q(S)$. where $\phi(S)$ is the characteristic vector (defined as a $\{0,1\}$ vector with 1 in position j if $i_j \in S$ and 0 otherwise) for subset S. However the benefit function $F_q$ could be arbitrary and it may not be possible to get such an assignment (B). Therefore, the algorithm searches for an assignment B that has the best possible approximation for the linearity property. An assignment B is called a K-tolerant benefits vector for the query q if it satisfies the following Equation 1:

$$\forall S \subseteq I_q : \frac{1}{K} F_q(S) \leq \phi(S) \cdot B \leq K F_q(S)$$

For every query, it would be ideal to obtain the K-tolerant benefits vector for the smallest possible K. For a fixed value of K, it is possible to obtain a K-tolerant benefits vector (if there exists one) by solving a linear program with the inequalities as in the above Equation 1 for every subset S of $I_q$. The algorithm starts with K=1 and incrementally increases the value of K by a factor, such as 1.1, until a value of K is found that resolves the inequalities. Thus a range of values for K (between the value found in the preceding step and its predecessor value) is established between which a feasible solution exists. Binary search techniques are then used to find the smallest value of K in this range for which a feasible solution exists. The following example illustrates how benefits are assigned.

EXAMPLE 1

Given a query q SELECT*FROM Employees WHERE Age≦30 AND Salary ≧75K. Let $I_A$ and $I_S$ denote indexes on columns Age and Salary respectively, and $b_A$ and $b_S$ respectively denote benefit to be assigned to each index for this query. Assume that the benefits obtained for q with configurations $\{I_A\}, \{I_S\}, \{I_A, I_S\}$ are 20, 10, and 25 units respectively. Then, the assignment $b_A$=16.66 and $b_S$=8.33 is a K-tolerant solution, where the smallest K=1.2. Note that using the DB2 approach discussed in the background section, both $b_A$ and $b_S$ would have been assigned the same value, 25.

For every set of relevant indexes $I_q$ for a query may still be large so that computing the value of $F_q(S)$ for every $S \in 2^{I_q}$ may be expensive since every such value requires a call to the query optimizer. Thus, in practice, the sets S for which the values $F_q(S)$ are computed (and hence the inequalities solved in the linear program) must be pruned. One such pruning strategy looks at the singleton sets and pairs of indexes. This pruning is based on the intuition that the pairs will capture most of the important interactions between indexes. Other pruning strategies may be used as well.

For every query $q_j$ a tolerance factor $K_j$ is obtained. The weighted value of $K_j$'s (weighted by the cost of query) gives an idea about the goodness of the solution. Higher values of $K_j$'s suggest that the benefit functions ($F_{q_j}$'s) are such that they cannot be approximated well by a linear function. It bears noting that if the elements of $2^{I_q}$ are not pruned and instead a true K-tolerant benefits vector is obtained for every query, then the solution presented by the algorithm has an approximation guarantee of $2K^2_{MAX}$. The following is a pseudocode representation of the algorithm just outlined. While this pseudocode represents a method of assigning benefit amongst indexes to maintain consistency with the preceding description, one of skill in the art will appreciate that it may also be applicable to any structure, such as materialized views.

| Input: | A query 1, set of relevant indexes $I_q$, |
|---|---|
| Output: | A benefit $b_k$ for every index $i_k$ in $I_q$ tolerance factor K |
| 1. | For every singleton subset $S = \{i_j\}$ and pair $S = \{i_j, i_k\}$ obtain the benefit Fq(S) using the query optimizer. |
| 2. | Set K = 1. |
| 3. | do |
| | set inequalities as in Equation 1. |
| | solve the system of inequations to find if there exists a feasible solution. |
| | if there exists a feasible solution assign $b_k$ (the vector B) as benefit of index $i_k$. |
| | Else set K = 2K |

This approach makes calls to the optimizer only in the first phase, i.e., during the benefits assignment phase. No optimizer calls are made in the second (greedy knapsack search) phase. Moreover, the size of the system of inequations to be solved is generally small (10's or 100's) so that obtaining a solution is very fast. In addition, this algorithm can give instance specific guarantees about the performance.

Once each structure has been assigned an atomic benefit in step 150, the enumeration algorithm 100 (FIG. 5) adds the benefits assigned in the prior step to a table of benefits that is kept over all queries from the workload that have been examined (step 155). Thus a sum of the benefits determined for a given structure over all queries is available when structures are selected for enumeration. Once all configurations have been analyzed for benefit for the present query, the algorithm gets another query and list of candidate configurations (step 110) until the time allotted for enumeration in the present time slice has expired (see decision step 158). At that time, the algorithm moves to the steps of compiling the list of recommended structures. As long as more space is available for storing structures, the structure with the highest benefit is added to the recommendation list until space or structures are exhausted (steps 160–180).

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

We claim:

1. In a relational database system, a computer implemented method for enumerating a set of physical design structures that optimizes database performance over a given workload consisting of workload entries comprising queries and updates that have been executed against the database, the method comprising the steps of:
  selecting a workload entry from the workload;
  identifying a set of candidate structures relevant to the workload entry;
  assigning a benefit to each of the candidate structures by
    evaluating the workload entry in the presence of subsets of a candidate structure to obtain an actual benefit for each subset of the candidate structure,
    forming a set of constraints on the benefit of the candidate structure, the set of constraints comprising a set of simultaneous linear inequations including a minimum value and a maximum value based on the actual benefit obtained for each subset of the candidate structure, the minimum value comprising the actual benefit divided by a first constant and the maximum value comprising the actual benefit multiplied by a second constant, and
    determining the benefit of the candidate structure by resolving the set of constraints; and
  enumerating the set of physical design structures based on the determined benefit for each of the candidate structures.

2. The method of claim 1 wherein the candidate structures comprise indexes on one or more attributes of the database.

3. The method of claim 1 wherein the candidate structures comprise materialized views of portions of the database.

4. The method of claim 1 comprising the step of selecting additional entries from the workload and wherein the identifying and assigning steps are repeated for each of the additional entries.

5. The method of claim 4 wherein a cumulative benefit is tabulated for each candidate structure by combining the benefit determined for the candidate structure for each entry that is evaluated.

6. The method of claim 1 wherein the enumerating step is performed by ranking the candidate structures based on their benefit and adding the candidate structures having the highest rank to the enumerated set until a predetermined storage limit is filled by the enumerated structures.

7. The method of claim 6 wherein the candidate structures are ranked by calculating a benefit per unit storage ratio for the candidate structure and ranking according to the ratio.

8. The method of claim 1 wherein the benefit of the set of candidate structures comprises the sum of benefits of each of the candidate structures in the set of candidate structures.

9. The method of claim 1 wherein the benefit satisfies the equation $$\forall S \subseteq I_q : \frac{1}{K} F_q(S) \le \phi(S) \cdot B \le K F_q(S)$$

10. The method of claim 9 wherein the equation $$\forall S \subseteq I_q : \frac{1}{K} F_q(S) \le \phi(S) \cdot B \le K F_q(S)$$

is satisfied for the smallest possible K.

11. The method of claim 1 wherein the first constant and second constants are equal.

12. The method of claim 1 wherein a solution that minimizes the value of the larger of the first constant and second constants is selected.

13. The method of claim 1 comprising the step of applying a pruning criteria to limit the number of subsets of a candidate structure.

14. The method of claim 13 wherein the pruning criteria establishes a limit on the number of subsets of a candidate structure.

15. For use in a relational database system, a computer readable storage medium comprising computer-executable instructions for performing a method for enumerating a set of physical design structures that optimizes database performance over a given workload consisting of workload entries comprising queries and updates that have been executed against the database, the method comprising the steps of:
  selecting a workload entry from the workload;
  identifying a set of candidate structures relevant to the workload entry;
  assigning a benefit to each of the candidate structures by
    evaluating the workload entry in the presence of subsets of a candidate structure to obtain an actual benefit for each subset of the candidate structure,
    forming a set of constraints on the benefit of the candidate structure, the set of constraints comprising a set of simultaneous linear inequations including a minimum value and a maximum value based on the actual benefit obtained for each subset of the candidate structure, the minimum value comprising the actual benefit divided by a first constant and the maximum value comprising the actual benefit multiplied by a second constant, and
    determining the benefit of the candidate structure by resolving the set of constraints; and enumerating the set of physical design structures based on the determined benefit for each of the candidate structures.

16. The computer readable medium of claim 15 wherein the candidate structures comprise indexes on one or more attributes of the database.

17. The computer readable medium of claim 15 wherein the candidate structures comprise materialized views of portions of the database.

18. The computer readable medium of claim 15 comprising the step of selecting additional entries from the workload and wherein the identifying and assigning steps are repeated for each of the additional entries.

19. The computer readable medium of claim 18 wherein a cumulative benefit is tabulated for each candidate structure by combining the benefit determined for the candidate structure for each entry that is evaluated.

20. The computer readable medium of claim 19 wherein enumerating the set of physical design structures is performed by ranking the candidate structures based on their benefit and adding the candidate structures having the highest rank to the enumerated set until a predetermined storage limit is filled by the enumerated structures.

21. The computer readable medium of claim 15 wherein the benefit of the set of candidate structures comprises the sum of benefits of each of the candidate structures in the set of candidate structures.

22. For use in a relational database system, a computing apparatus for enumerating a set of physical design structures that optimizes database performance over a given workload consisting of workload entries comprising queries and updates that have been executed against the database, the apparatus comprising:
an entry selector for selecting a workload entry from the workload;
a candidate identification tool for identifying a set of candidate structures relevant to the workload entry;
a benefit assignment tool for assigning a benefit to each of the candidate structures by
evaluating the workload entry in the presence of subsets of a candidate structure to obtain an actual benefit for each subset of the candidate structure,
forming a set of constraints on the benefit of the candidate structure, the set of constraints comprising a set of simultaneous linear inequations including a minimum value and a maximum value based on the actual benefit obtained for each subset of the candidate structure, the minimum value comprising the actual benefit divided by a first constant and the maximum value comprising the actual benefit multiplied by a second constant, and
determining the benefit of the candidate structure by resolving the set of constraints; and
a design enumerator for enumerating the set of physical design structures based on the determined benefit for each of the candidate structures.

23. The apparatus of claim 22 wherein the entry selector selects additional entries from the workload and wherein the candidate identification and benefit assignment tools process each of the additional entries.

24. The apparatus of claim 23 further comprising a benefit tabulation tool for tabulating a cumulative benefit for each candidate structure by combining the benefit determined for the candidate structure for each entry that is evaluated.

25. The apparatus of claim 22 wherein the design enumerator ranks the candidate structures based on their benefit and adds the candidate structures having the highest rank to the enumerated set until a predetermined storage limit is filled by the enumerated structures.

26. The apparatus of claim 22 wherein the benefit assignment tool assigns the benefit of the set of candidate structures to comprise the sum of benefits of each of the candidate structures in the set of candidate structures.

27. For use in a relational database system, a computing apparatus for enumerating a set of physical design structures that optimizes database performance over a given workload consisting of workload entries comprising queries and updates that have been executed against the database, the apparatus comprising:
means for selecting a workload entry from the workload;
means for identifying a set of candidate structures relevant to the workload entry;
means for assigning a benefit to each of the candidate structures by
evaluating the workload entry in the presence of subsets of a candidate structure to obtain an actual benefit for each subset of the candidate structure,
forming a set of constraints on the benefit of the candidate structure, the set of constraints comprising a set of simultaneous linear inequations including a minimum value and a maximum value based on the actual benefit obtained for each subset of the candidate structure, the minimum value comprising the actual benefit divided by a first constant and the maximum value comprising the actual benefit multiplied by a second constant, and
determining the benefit of the candidate structure by resolving the set of constraints; and
means for enumerating the set of physical design structures based on the determined benefit for each of the candidate structures.

28. The apparatus of claim 27 wherein means for selecting selects additional entries from the workload and wherein the means for identifying and means for assigning process each of the additional entries.

29. The apparatus of claim 28 comprising a means for tabulating a cumulative benefit for each candidate structure by combining the benefit determined for the candidate structure for each entry that is evaluated.

30. The apparatus of claim 27 wherein the means for enumerating ranks the candidate structures based on their benefit and adds the candidate structures having the highest rank to the enumerated set until a predetermined storage limit is filled by the enumerated structures.

31. The apparatus of claim 27 wherein the benefit of the set of candidate structures comprises the sum of benefits of each of the candidate structures in the set of candidate structures.

32. The apparatus of claim 27 wherein the means for assigning a benefit to each of the candidate structures maximizes the sum $\Sigma_{q_i \in Q} F_{q_i}(S)$.

33. The apparatus of claim 22 wherein the benefit assignment tool for assigning a benefit to each of the candidate structures maximizes the sum $\Sigma_{q_i \in Q} F_{q_i}(S)$.

34. The computer readable medium of claim 15 wherein the assigning of the benefit to each of the candidate structures maximizes the sum $\Sigma_{q_i \in Q} F_{q_i}(S)$.

35. The method of claim 1 wherein the assigning a benefit to each of the candidate structures maximizes the sum $\Sigma_{q_i \in Q} F_{q_i}(S)$.

* * * * *